United States Patent

Long

(10) Patent No.: US 12,502,945 B2
(45) Date of Patent: Dec. 23, 2025

(54) HYBRID OR ELECTRIC-ONLY TRANSAXLE ARRANGEMENT FOR WORK VEHICLE

(71) Applicant: Deere & Company, Moline, IL (US)

(72) Inventor: Randall L. Long, Coffeyville, KS (US)

(73) Assignee: DEERE & COMPANY, Moline, IL (US)

(*) Notice: Subject to any disclaimer, the term of this patent is extended or adjusted under 35 U.S.C. 154(b) by 648 days.

(21) Appl. No.: 17/868,372

(22) Filed: Jul. 19, 2022

(65) Prior Publication Data

US 2024/0025244 A1 Jan. 25, 2024

(51) Int. Cl.
*B60K 6/40* (2007.10)
*B60K 6/442* (2007.10)
(Continued)

(52) U.S. Cl.
CPC .......... *B60K 6/40* (2013.01); *B60K 6/442* (2013.01); *B60K 17/165* (2013.01); *B60K 17/28* (2013.01);
(Continued)

(58) Field of Classification Search
CPC . B60K 6/40; B60K 6/442; B60K 6/52; B60K 17/165; B60K 17/28; B60K 17/344; B60K 1/02; B60K 7/0007; B60R 16/0231; F16H 37/0806; F16H 48/00; F16H 2200/0021; Y02T 10/62
See application file for complete search history.

(56) References Cited

U.S. PATENT DOCUMENTS 9,199,537 B2 * 12/2015 Hotta ................... B60L 58/30
9,744,843 B2 * 8/2017 Kochidomari ....... B60K 17/043
(Continued)

FOREIGN PATENT DOCUMENTS

DE 102019214202 A1 3/2021
DE 102022204738 A1 11/2023
WO 2020187878 A1 9/2020

OTHER PUBLICATIONS

"Transaxle" Merriam-Webster.com Dictionary, Merriam-Webster, https://www.merriam-webster.com/dictionary/transaxle. Accessed Jun. 13, 2025. (Year: 1958).*
(Continued)

*Primary Examiner* — Steve Clemmons
(74) *Attorney, Agent, or Firm* — KLINTWORTH & ROZENBLAT LLP

(57) ABSTRACT

A work vehicle transaxle arrangement includes a main shaft; at least one transaxle gear assembly; a differential drive shaft; a first electric machine configured to drive rotation of the differential drive shaft such that mechanical power is distributed through the differential to the axle half-shafts; a second electric machine; a PTO shaft; and a hydraulic pump. In a hybrid configuration, the main shaft is configured to be driven by an internal combustion engine to power the PTO shaft and the second electric machine such that the second electric machine generates electrical power routed through the inverter to at least partially drive the first electric machine; and in an electric-only configuration, the second electric machine is driven by electrical power routed through the inverter and drawn from the battery to generate mechanical power that drives the PTO shaft and the hydraulic pump through the at least one transaxle gear assembly.

20 Claims, 12 Drawing Sheets

(51) Int. Cl.
*B60K 17/16* (2006.01)
*B60K 17/28* (2006.01)
*B60K 17/344* (2006.01)
*B60R 16/023* (2006.01)
*F16H 37/08* (2006.01)

(52) U.S. Cl.
CPC ........ *B60K 17/344* (2013.01); *B60R 16/0231* (2013.01); *F16H 37/0806* (2013.01); *B60Y 2200/92* (2013.01)

(56) References Cited

U.S. PATENT DOCUMENTS

| | | | |
|---|---|---|---|
| 10,099,552 B2 | 10/2018 | Long et al. | |
| 10,173,662 B2* | 1/2019 | Muench | B60W 20/11 |
| 10,759,431 B2* | 9/2020 | Fritz | B60W 10/08 |
| 10,808,813 B2* | 10/2020 | Sugimoto | B60K 6/36 |
| 10,988,193 B2 | 4/2021 | Watt et al. | |
| 11,060,589 B2* | 7/2021 | Base | B60P 3/064 |
| 11,794,572 B2* | 10/2023 | Engerman | B60K 17/08 |
| 12,115,853 B2* | 10/2024 | Igl | F16H 3/089 |
| 2013/0066496 A1* | 3/2013 | Ishii | B60W 10/30 |
| | | | 903/930 |
| 2020/0269673 A1* | 8/2020 | Watt | B60K 6/48 |
| 2021/0291806 A1* | 9/2021 | Forte | B60K 6/365 |
| 2022/0032763 A1 | 2/2022 | Lang et al. | |
| 2022/0340001 A1* | 10/2022 | Sagmeister | B60K 6/365 |
| 2023/0173911 A1* | 6/2023 | Lege | F16H 48/36 |

OTHER PUBLICATIONS

German Search Report issued in application No. DE102023110660.0 dated Dec. 15, 2023 (05 pages).

* cited by examiner

HYBRID OR ELECTRIC-ONLY TRANSAXLE ARRANGEMENT FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicle, and more specifically to transaxle arrangements for work vehicles.

BACKGROUND OF THE DISCLOSURE

Work (and other) vehicle power trains may include one or more types of onboard power sources to provide motive and other power during operation. Generally, some work vehicles may incorporate an internal combustion engine (e.g., a diesel engine). Other work vehicles may have electric machines in addition to or in lieu of the internal combustion engine, and such electric machines may operate as motors or generators for supplying mechanical or electrical power to various components. As such, although the choice of power sources may vary, such variability may present challenges in designing other aspects to the work vehicle in order to accommodate the particular sources of power.

SUMMARY OF THE DISCLOSURE

The invention provides a transaxle arrangement suitable for use in hybrid or electric-only work vehicles.

Specifically, in one aspect the invention, a work vehicle transaxle arrangement is provided for a work vehicle having a battery, one or more axle half-shafts, a differential configured to distribute power to the one or more axle half-shafts, and hydraulic functions. The work vehicle transaxle arrangement includes a main shaft; at least one transaxle gear assembly mechanically coupled to the main shaft; a differential drive shaft coupled to the differential; a first electric machine configured to drive rotation of the differential drive shaft such that mechanical power from the differential drive shaft is distributed through the differential to the one or more axle half-shafts; a second electric machine rotationally coupled to the main shaft via the at least one transaxle gear assembly; an inverter through which the first electric machine and the second electric machine are electrically coupled and configured to be coupled to the battery; a power takeoff shaft (PTO) shaft mechanically driven through the at least one transaxle gear assembly; and a hydraulic pump driven through the at least one transaxle gear assembly to provide hydraulic fluid flow to the hydraulic functions of the work vehicle. In a hybrid work vehicle configuration, the main shaft is configured to be driven by an internal combustion engine to power the PTO shaft and the second electric machine such that the second electric machine generates electrical power routed through the inverter to at least partially drive the first electric machine; and in an electric-only work vehicle configuration, the second electric machine is driven by electrical power routed through the inverter and drawn from the battery to generate mechanical power that drives the PTO shaft and the hydraulic pump through the at least one transaxle gear assembly.

In a further aspect of the work vehicle transaxle arrangement, in the hybrid work vehicle configuration, the hydraulic pump is driven by mechanical power from the main shaft.

In a further aspect of the work vehicle transaxle arrangement, the PTO shaft is a rear PTO shaft and the transaxle arrangement further comprises a front PTO shaft mechanically driven through the at least one transaxle gear assembly.

In a further aspect of the work vehicle transaxle arrangement, in each of the hybrid work vehicle configuration and the electric-only work vehicle configuration, the front PTO shaft is driven with mechanical power from the first electric machine via the at least one transaxle gear assembly.

In a further aspect of the work vehicle transaxle arrangement, the at least one transaxle gear assembly includes a countershaft engaged with each of the differential drive shaft and the front PTO shaft such that, in each of the hybrid work vehicle configuration and the electric-only work vehicle configuration, the front PTO shaft is driven with mechanical power from the first electric machine that is routed through the differential drive shaft and the countershaft to the front PTO shaft.

In a further aspect of the work vehicle transaxle arrangement, the front PTO shaft is a mechanical front wheel drive (MFWD) shaft.

In a further aspect of the work vehicle transaxle arrangement, in the electric-only work vehicle configuration, the PTO shaft is driven by mechanical power from the second electric machine that is routed from the second electric machine, through the main shaft, and to the PTO shaft via the at least one transaxle gear assembly.

In a further aspect of the work vehicle transaxle arrangement, the at least one transaxle gear assembly includes a PTO gear assembly disposed between the main shaft and the PTO shaft.

In a further aspect of the work vehicle transaxle arrangement, the at least one transaxle gear assembly includes a pi drive gear assembly disposed between the main shaft and the second electric machine.

In a further aspect of the work vehicle transaxle arrangement, in each of the hybrid work vehicle configuration and the electric work vehicle configuration, the first electric machine drives rotation of the differential drive shaft such that mechanical power from the differential drive shaft is distributed through the differential to the one or more axle half-shafts in a single mode without intervening clutches.

In a further aspect of the work vehicle transaxle arrangement, a first set of bus bars is provided for electrically coupling the first electric machine to the inverter and a second set of bus bars is provided for electrically coupling the second electric machine to the inverter. In a further aspect of the work vehicle transaxle arrangement, at least one of the first set of bus bars or the second set of bus bars are configured to extend around at least a portion of the at least one transaxle gear assembly.

In a further aspect, a work vehicle power system is provided and includes a battery and a work vehicle transaxle arrangement receiving electrical power from the battery. The work vehicle transaxle arrangement includes one or more axle half-shafts configured to transfer mechanical power to one or more wheels; a differential configured to distribute power to the one or more axle half-shafts; a main shaft; at least one transaxle gear assembly mechanically coupled to the main shaft; a differential drive shaft coupled to the differential; a first electric machine configured to drive rotation of the differential drive shaft such that mechanical power from the differential drive shaft is distributed through the differential to the one or more axle half-shafts; a second electric machine rotationally coupled to the main shaft via the at least one transaxle gear assembly; an inverter through which the first electric machine and the second electric machine are electrically coupled and configured to be coupled to the battery; a power takeoff shaft (PTO) shaft mechanically driven through the at least one transaxle gear assembly; and a hydraulic pump driven through the at least one transaxle gear assembly to provide hydraulic fluid flow for hydraulic functions of the work vehicle. In a hybrid work vehicle configuration, the main shaft is configured to be driven by an internal combustion engine to power the PTO shaft and the second electric machine such that the second electric machine generates electrical power routed through the inverter to at least partially drive the first electric machine; and in an electric-only work vehicle configuration, the second electric machine is driven by electrical power routed through the inverter and drawn from the battery to generate mechanical power that drives the PTO shaft and the hydraulic pump through the at least one transaxle gear assembly.

In a further aspect of the work vehicle power system, the engine is included and configured to drive the main shaft during the hybrid work vehicle configuration; and a controller configured to selectively discontinue operation of the engine to operate in the electric-only work vehicle configuration.

In a further aspect of the work vehicle power system, the PTO shaft is a rear PTO shaft and the transaxle arrangement further comprises a front PTO shaft mechanically driven through the at least one transaxle gear assembly.

In a further aspect of the work vehicle power system, in each of the hybrid work vehicle configuration and the electric-only work vehicle configuration, the front PTO shaft is driven with mechanical power from the first electric machine via the at least one transaxle gear assembly.

In a further aspect of the work vehicle power system, the at least one transaxle gear assembly includes a countershaft engaged with each of the differential drive shaft and the front PTO shaft such that, in each of the hybrid work vehicle configuration and the electric-only work vehicle configuration, the front PTO shaft is driven with mechanical power from the first electric machine that is routed through the differential drive shaft and the countershaft to the front PTO shaft.

In a further aspect of the work vehicle power system, in the electric-only work vehicle configuration, the PTO shaft is driven by mechanical power from the second electric machine that is routed from the second electric machine, through the main shaft, and to the PTO shaft via the at least one transaxle gear assembly.

In a further aspect of the work vehicle power system, a first set of bus bars is provided for electrically coupling the first electric machine to the inverter and a second set of bus bars is provided for electrically coupling the second electric machine to the inverter.

In a further aspect of the work vehicle power system, at least one of the first set of bus bars or the second set of bus bars are configured to extend around at least a portion of the at least one transaxle gear assembly.

The details of one or more embodiments are set-forth in the accompanying drawings and the description below.

Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
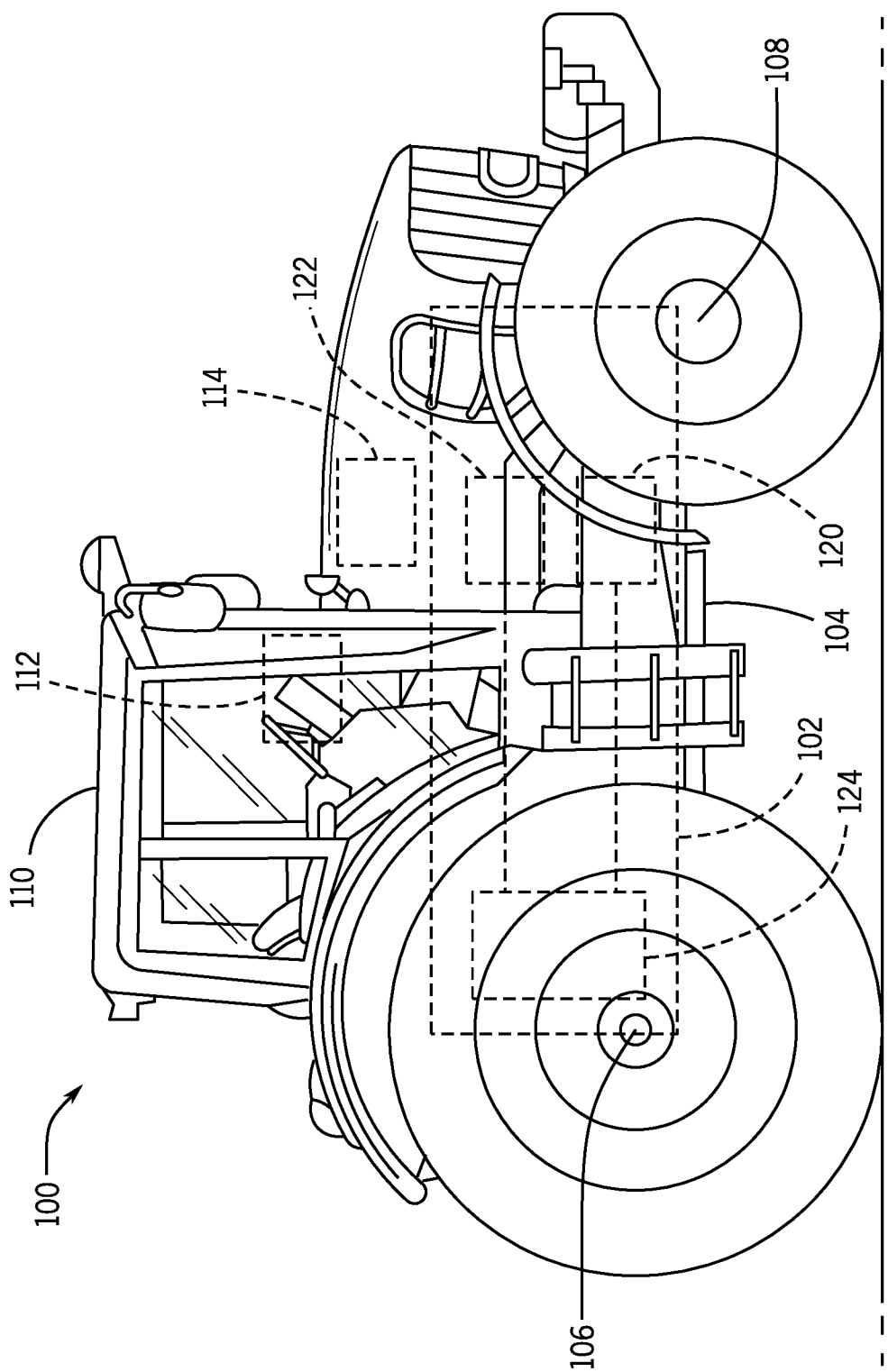
FIG. 1 schematically illustrates a work vehicle in the form of an agricultural tractor that may implement a transaxle arrangement suitable for use in hybrid or electric-only implementations in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As noted above, work vehicles may have power systems with various types of power sources, including electric machines (or motor generators) and/or internal combustion engines, to provide tractive power through a powertrain as well as to power other aspects of the vehicle, such as hydraulic pumps and power take-off (PTO) shafts. For example, in a "hybrid" configuration, a work vehicle may include an internal combustion engine that is supplemented one or more electric machines that utilize electrical power stored in one or more batteries; and in an "electric-only" configuration, a work vehicle may omit the internal combustion engine and rely exclusively on one or more electric machines powered by the one or more batteries. Consumers, work environment, and regulatory schemes may favor one type of power source configuration relative to another. Regardless, it is beneficial if the other aspects of the work vehicle may be integrated with either type of power source configuration. Such compatibility or configurability may provide improvements with respect to the cost and complexity of manufacture and assembly of the work vehicle.

Disclosed herein is a transaxle arrangement that may be implemented in work vehicles having either a hybrid configuration or an electric-only configuration (i.e., with or without an internal combustion engine). Generally, a transaxle arrangement is a single device or arrangement that combines the functions of a transmission, axle, and differential into an integrated assembly. According to the disclosure described herein, the transaxle arrangement may include one or more electric machines (or motor generators), an inverter, a differential, and various power transfer elements that are configured to distribute power from an internal combustion engine in combination with one or more batteries (generally, a "battery") or from only the battery to one or more wheels, as well as one more power sinks, including a rear power take-off (PTO) shaft, a front PTO shaft (or MFWD (mechanical front wheel drive)) shaft, and/or a pump. In other words, the transaxle arrangement provides the flexibility and/or adaptability to be integrated into a hybrid work vehicle or an electric-only work vehicle with little or no modifications. In addition to providing a common drive or powertrain platform, the electric machines and mechanical interconnections of the transaxle arrangement provide a reduction in gears, clutches, and overall part count, thereby providing reductions in cost and complexity and improvements in efficiency and performance. For example, in some instances, the transaxle arrangement may provide a suitable range of speed and torque to the wheels with a "single mode", e.g., without requiring clutch shifts. Additionally, the transaxle arrangement may reduce or eliminate load requirements for a separate frame in that the transaxle arrangement may, in effect, form part of the frame or chassis of the work vehicle.

As used herein, the terms "front," "forward," "rear," "rearward", "upper", "top", "lower", and "bottom" are merely example relative terms with respect to a primary direction of travel of a depicted configuration of a work vehicle. In other examples, the components referenced by those terms may be reversed in accordance with the present disclosure. Furthermore, in detailing the disclosure, terms of direction and orientation, such as "downstream," "upstream," "longitudinal," "radial," "axial," "circumferential," "lateral," and "transverse" may be used. Such terms are defined, at least in part, with respect to individual or collective rotating or stationary components.

Although the discussion below refers to an implementation in a tractor as a work vehicle, in further embodiments, the below-described transaxle arrangements and variants thereof can be integrated into other types of work vehicle platforms, such as work vehicle vehicles employed within the agricultural, construction, forestry, and mining industries. Accordingly, the following description should be understood as merely establishing a non-limiting context in which embodiments of the present disclosure may be better understood.

Example Embodiments of a Hybrid or Electric-Only Transaxle Arrangement Fora Work Vehicle As will become apparent from the discussion herein, the disclosed transaxle arrangement may be used advantageously in a variety of settings and with a variety of machinery, including, for example, a work vehicle 100 such as depicted in FIG. 1. In FIG. 1, the work vehicle 100 is depicted as a tractor with a power system 102 (shown schematically). It will be understood, however, that other configurations may be possible, including configurations with the work vehicle 100 as a different kind of tractor, a harvester, a log skidder, a grader, or one of various other work vehicle types.

Generally, the work vehicle 100 may include a chassis 104 that supports the various components of the vehicle 100, including the power system 102, front and rear wheels 106, 108, and a cab 110. In one example, the power system 102 may be configured to generate power and to transmit the power from one or more power sources, such as an engine 120 and/or one or more batteries (generally, a battery) 122, to a transaxle arrangement 124 to drive at least the rear wheels 108 and/or the front wheels 106, as well as various additional components associated with the work vehicle 100. Typically, the engine 120 may be an internal combustion engine. However, in some examples as discussed in greater detail below, the engine 120 may be considered optional and omitted such that the work vehicle 100 is powered entirely by the battery 122.

As additional power sinks to the one or more wheels 106, 108, the transaxle arrangement 124 of the power system 102 may be configured for delivering power to one or more power take-off (PTO) shafts that drives an implement that is supported on the work vehicle 100 or that is supported on a separate vehicle. For example, the transaxle arrangement 124 may power a rear PTO shaft and a forward PTO shaft (e.g., functioning as a mechanical front wheel drive (MFWD) shaft). Additionally, the transaxle arrangement 124 may operate to power a hydraulic pump. It will be appreciated that the transaxle arrangement 124 and/or overall power system 102 may be configured for delivering power to other power sinks without departing from the scope of the present disclosure.

In some examples, the transaxle arrangement 124 and other aspects of the power system 102 may form part of the chassis 104 of the work vehicle 100. In particular, the transaxle arrangement 124 (and the front axle) may be affixed to the engine 120, thereby reducing or eliminating or reducing the need for a separate chassis or frame structure. In other examples, the transaxle arrangement 124 may be supported on other aspects of the work vehicle 100 functioning as the chassis 104.

The work vehicle 100 further includes a controller 114 that controls or facilitates control of the work vehicle 100, particularly the power system 102 and/or transaxle arrangement 124 to perform any of the functions described herein, either automatically or based on operator commands via an operator interface 112. Such operator interface 112 may be configured in a variety of ways and may include one or more joysticks, various switches or levers, one or more buttons, a touchscreen interface that may be overlaid on a display, a keyboard, a speaker, a microphone associated with a speech recognition system, or various other human-machine interface devices. For example, the controller 114 may operate the transaxle arrangement 124 in various power configurations, discussed below.

As an example, the controller 114 may be configured as computing devices with associated processor devices and memory architectures, as hydraulic, electrical or electro-hydraulic controllers, or otherwise. In one example, the controller 114 may be implemented with processing architecture such as a processor and memory, as well as suitable communication interfaces. For example, the controller 114 may implement functional modules or units with the processor based on programs or instructions stored in memory.

Additional details regarding the power system 102, particularly the transaxle arrangement 124 are provided below with reference to FIGS. 2A, 2B, and 3-11.

Figure 2A:
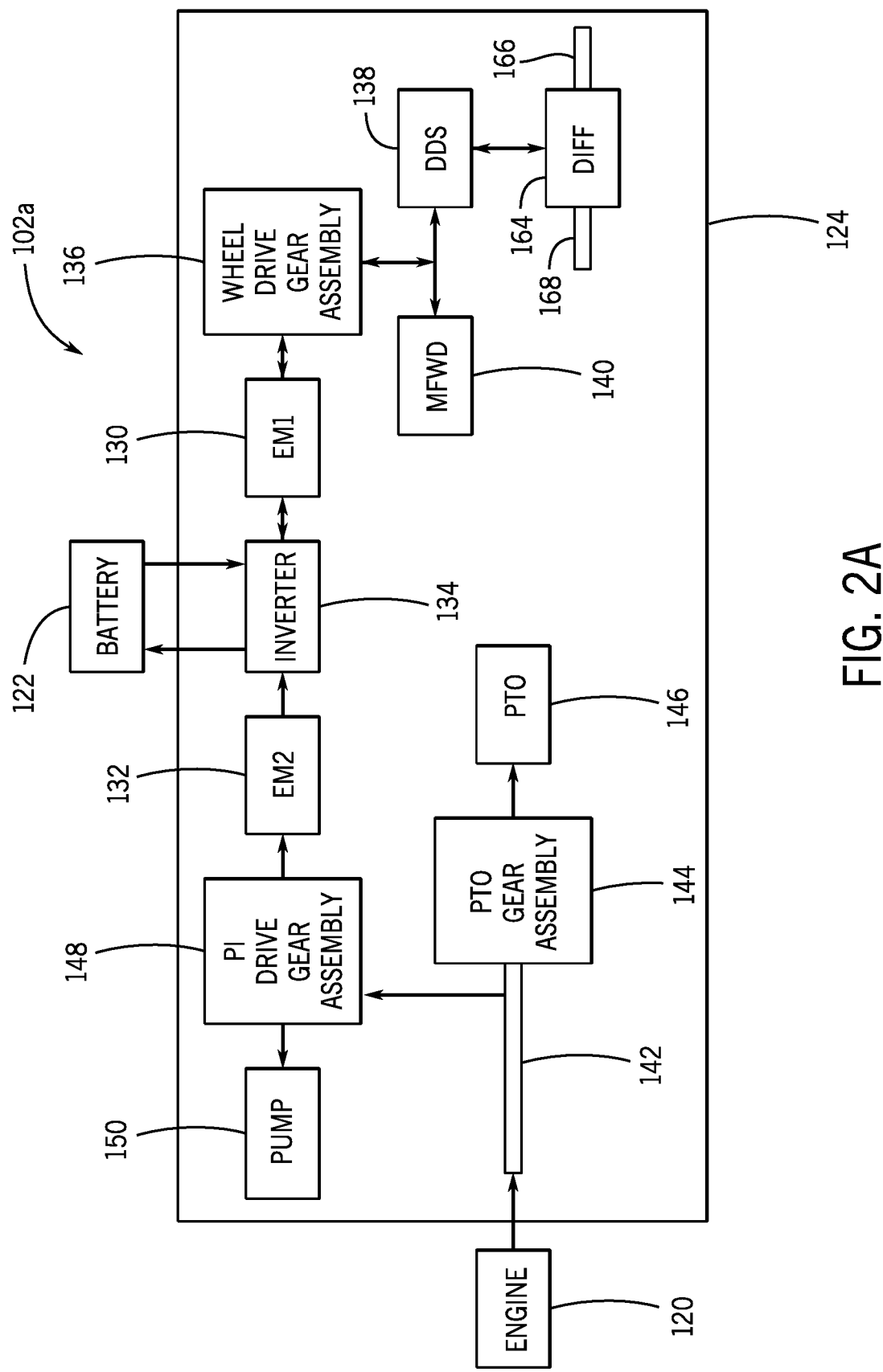
FIG. 2A is a schematic view of a first power system with a transaxle arrangement that may be incorporated into the work vehicle of FIG. 1 according to an example embodiment of the present disclosure.
Figure 2B:
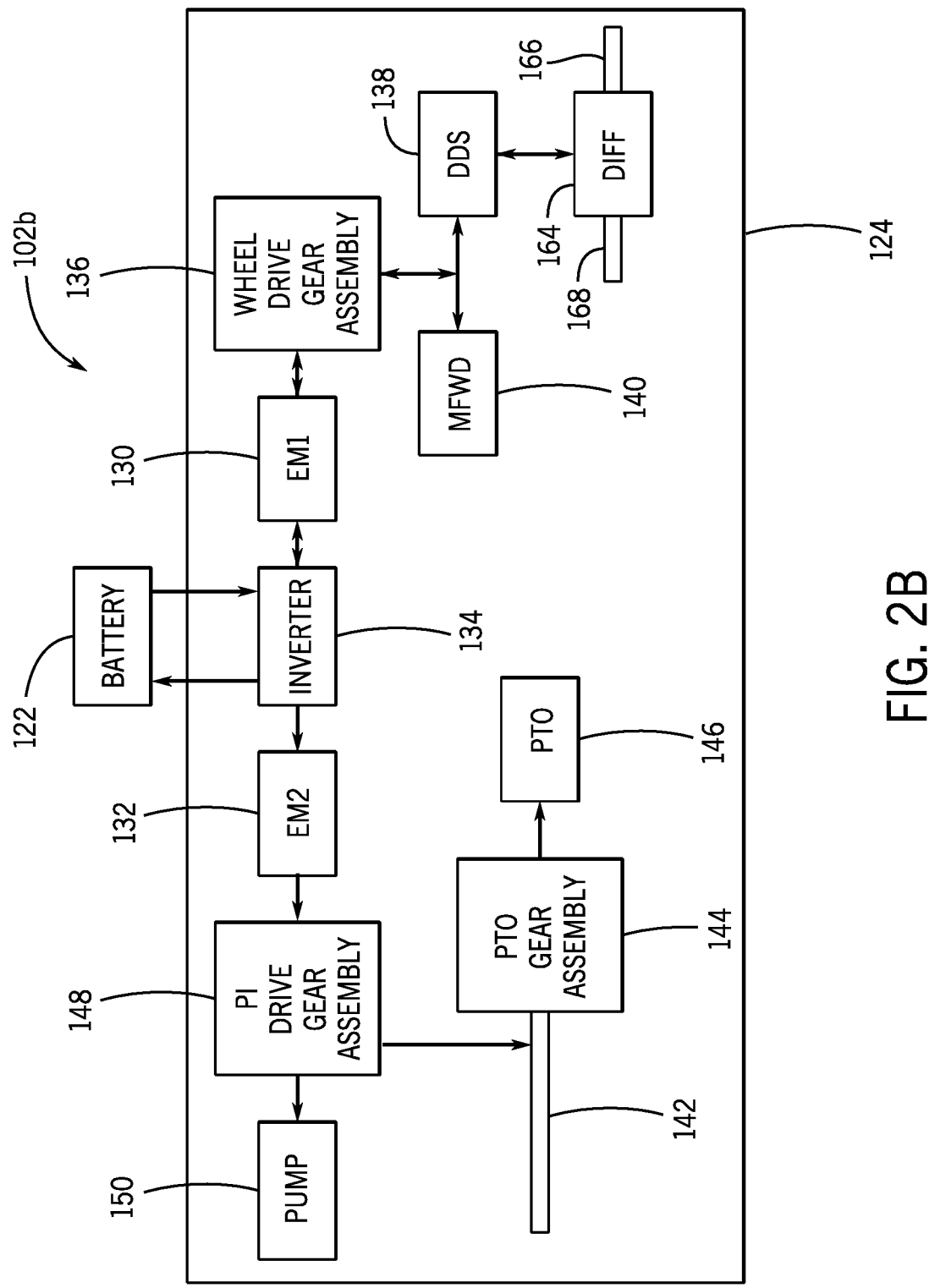
FIG. 2B is a schematic view of a further power system with the transaxle arrangement that may be incorporated into the work vehicle of FIG. 1 according to an example embodiment of the present disclosure.

As introduced below, the transaxle arrangement 124 is suitable for use in various work vehicle configurations. As examples, FIGS. 2A and 2B provide two variations of implementation of power systems, such as the power system 102 depicted in FIG. 1. Generally, the power system 102a of FIG. 2A is a "hybrid" implementation in which power is supplied by both an engine (e.g., engine 120 of FIG. 1) and one or more batteries (e.g., battery 122 of FIG. 1); and the power system 102b of FIG. 2B is an "electric-only" implementation in which power is only provided by one or more batteries (e.g., battery 122 of FIG. 1). In each implementation, the transaxle arrangement 124 may have identical or comparable features. The electric-only configuration may particularly be implemented in a work vehicle that does not have an engine; but however, even when an engine is present, the controller (e.g., controller 114) mays selectively operate the transaxle arrangement 124 in an electric-only configuration or mode without engine input or in the hybrid configuration or mode that receives engine input.

Generally, the transaxle arrangement 124 includes at least two electric machines (or motor generators) 130, 132 and an inverter 134 that facilitate the distribution of power between the power sources (e.g., the engine 120 and/or battery 122) and the power sinks that may be associated with the transaxle arrangement 124. As described in greater detail below, one or both of electric machines 130, 132 may selectively operate as a motor in which electrical power is converted into mechanical power or as a generator in which mechanical power is converted into electrical power; and the inverter 134 may operate to convert electrical power between direct current and alternating current, as well as to facilitate distribution of the electrical power between the battery 122 and the electric machines 130, 132. In one example, the inverter 134 may be an SiC-type inverter that utilizes internal-type bus bars, although other types of inverters and connections may be provided. Generally, the electric machines 130, 132 and/or inverter 134 may be sized to achieve the desired power demands to the transaxle arrangement 124, the power system 102, and/or the overall vehicle 100. In this example, the power sinks of the transaxle arrangement 124 may include a differential drive shaft (DDS) 138 coupled to a differential 164 and half-shafts 166, 168, a mechanical front wheel drive (MFWD) shaft (or, generally, a front power take-off (PTO) shaft) 140, a rear power take-off (PTO) shaft 146, and/or a hydraulic pump 150.

Broadly, the DDS 138 in FIGS. 2A and 2B is configured to a drive the differential 164 that distributes mechanical power to half-shafts 166, 168 and to the rear wheels (e.g., wheels 108 of FIG. 1). Generally, the DDS 138, differential 164, and/or half-shafts 166, 168 may include various power transfer elements, including shaft elements, gears, clutches, and the like for the distribution and transfer of power. However, in some examples, the power flow path from the power source (e.g., electric machine 130) and through the DDS 138, differential 164, and/or half-shafts 166, 168 may achieve a suitable range with only one "mode" (e.g., does not require any clutches). Additional details regarding the DDS 138, differential 164, and/or half-shafts 166, 168 will be provided below.

The MFWD shaft 140 may be considered a mechanical output shaft of the transaxle arrangement 124 that extends in the forward direction that, in one example, drives the front wheels (e.g., wheels 106 of FIG. 1) via a front differential (not shown) or the like. Generally, however, the MFWD shaft 140 may be any type of output shaft in the form of a front power take-off shaft (PTO) that provides mechanical power to any aspect of the work vehicle 100 (FIG. 1) or cooperating implement. Similarly, the rear PTO shaft 146 is a mechanical output shaft of the transaxle arrangement 124 that extends in the rearward direction to drive, for example, any aspect of the work vehicle 100 (FIG. 1) or cooperating implement. In some examples, the transaxle arrangement 124 may include one or more clutches to selectively connect and disconnect the MFWD shaft 140 and/or rear PTO shaft 146 from the power flow. Such clutches may be operating based on commands from the controller 114.

The hydraulic pump 150 may be any type of hydraulic pump that receives mechanical power via the transaxle arrangement 124 to distribute fluid through the transaxle arrangement 124 and/or other aspects of the work vehicle 100.

As described below, the transaxle arrangement 124 may include a number of power transfer elements that distribute mechanical power between the electric machines 130, 132 that receive and/or generate mechanical power; a main shaft 142 that may receive mechanical power from the engine 120 (if present) or otherwise transfer mechanical power within the transaxle arrangement 124; and/or the various power sinks that utilize the mechanical power, including the DDS 138, the MFWD shaft 140, the rear PTO shaft 146, and/or the hydraulic pump 150. In the examples of FIGS. 2A and 2B, the various transfer elements may be broadly referenced as a wheel drive gear assembly 136, a PTO gear assembly 144, and a "pi drive" gear assembly 148. Generally, these gear assembly 136, 144, 148 may be considered any suitable combination of gears, clutches, and/or force transmission elements to condition and/or transfer mechanical power between the various elements of the transaxle arrangement 124. As described in greater detail below, the wheel drive gear assembly 136 generally functions to transfer power from the first electric machine 130 to the DDS 138 and/or MFWD shaft 140; the PTO gear assembly 144 generally functions transfer power from the main shaft 142 to the rear PTO shaft 146; and the pi drive gear assembly 148 generally functions to transfer power between the second electric machine 132, the main shaft 142, and/or the pump 150. Alternative and/or additional gear assemblies may be provided and/or one or more of the gear assemblies 136, 144, 148 may be omitted. Moreover, although the gear assembly 148 is referenced as a "pi drive" gear assembly 148, other types of gear assemblies may be used. However, the pi drive gear assembly 148 is so referenced due to the nature of the gear reduction. In particular, the pi drive gear assembly 148 may contain one or more planetary gear sets having a speed reduction ratio substantially equivalent to pi; the term "substantially equivalent to pi" further defined herein as pi±5%. Given this speed reduction ratio, such a pi drive gear assembly 148 is well-suited conditioning the power from the electric machine 132 while providing a high contact ratio and configurable gear arrangement. Collectively or individually, the wheel drive gear assembly 136, the PTO gear assembly 144, and the pi drive gear assembly 148 may be considered one or more transaxle gear assemblies.

Reference is particularly made to FIG. 2A, in which the power system 102 is a hybrid implementation such that the transaxle arrangement 124 may receive power from both the engine 120 and the battery 122. According to one example of operation, the transaxle arrangement 124 may receive rotational power from the engine 120 via the main shaft 142 to drive the rear PTO shaft 146 via the PTO gear assembly 144. As noted, the PTO gear assembly 144 may be any suitable combination of force transmission elements such that the rotational power from the engine 120 may be suitably conditioned to drive the rear PTO shaft 146 at one or more appropriate speeds.

The rotational power from the engine 120 may also be used to drive the pump 150 and/or the second electric machine 132. As shown, in one example, the pump 150 and/or second electric machine 132 may receive the rotational power from the engine 120 via interaction between the main shaft 142 and the pi drive gear assembly 148. Such interaction may include cooperating gears between the main shaft 142 and an element of (or coupled to) the pi drive gear assembly 148. In other examples, the power flow path between the main shaft 142 and the pump 150 and/or the second electric machine 132 may bypass the pi drive gear assembly 148.

In this example, upon receipt of engine power, the second electric machine 132 may operate as a generator in order to convert the rotational mechanical power into electrical power, which may be directed (and/or conditioned) via the inverter 134 to be stored in the battery 122 and/or transferred to the first electric machine 130. In additional to the power received via the inverter 134 from the second electric machine 132 the battery 122 may also supplement the electrical power directed to the first electric machine 130 via the inverter 134.

In this example, the first electric machine 130 may operate as a motor in order convert the electrical power via the inverter 134 into mechanical power. The mechanical power from the first electric machine 130 may be used to drive the DDS 138 and MFWD shaft 140 via the wheel drive gear assembly 136. In one example, due to the variability of the first electric machine 130, the wheel drive gear assembly 136 may operate without requiring clutches. In some configurations and scenarios, the wheel drive gear assembly 136 may also operate to transfer mechanical power via the DDS 138 and/or MFWD shaft to the first electric machine 130 such that the first electric machine 130 operates as a generator to generate electrical power, which may be stored in the battery 122 via the inverter 134.

As noted above, the transaxle arrangement 124 may also operate without an engine 120 (e.g., as an electric-only configuration), generally without modifications. Such operation is depicted by the schematic block diagram of FIG. 2B. As above, the transaxle arrangement 124 may operate to drive a number of power sinks, including the DDS 138, the MFWD shaft 140, the rear PTO shaft 146, and the pump 150. In this example, the battery 122 is the sole source of power in that the engine 120 has been omitted or otherwise mechanically disconnected.

As shown, the battery 122 provides electrical power to the inverter 134, which distributes the electrical power to the first electric machine 130 and the second electric machine 132. As above, the first electric machine 130 operates as a motor to convert the electrical power into mechanical power, which may be used to drive the DDS 138 and the MFWD shaft 140 via the wheel drive gear assembly 136. In some configurations and scenarios, the wheel drive gear assembly 136 may also operate to transfer mechanical power via the DDS 138 and/or MFWD shaft 140 to the first electric machine 130 such that the first electric machine 130 operates as a generator to generate electrical power, which may be stored in the battery 122 via the inverter 134.

In this example, and in contrast to the implementation of FIG. 2A, the second electric machine 132 of FIG. 2B also operates as motor to convert the electrical power into mechanical power in order to drive the pump 150 via the pi drive gear assembly 148. Additionally, the mechanical power may be transferred via the pi drive gear assembly 148 (or other mechanism) to the main shaft 142 in order to drive the rear PTO shaft 146 via the PTO gear assembly 144.

As reflected by FIGS. 2A and 2B, the transaxle arrangement 124 described herein may operate with an engine (e.g., engine 120) or without (e.g., only with battery 122). Even so, the transaxle arrangement 124 may have a common configuration and/or distribute power to common power sinks.

While simplified and schematic examples of operations of the transaxle arrangement 124 are depicted in FIGS. 2A and 2B, a further example of a transaxle arrangement 224 will now be described with reference to FIGS. 3-11. Unless otherwise noted, the characteristics of the transaxle arrangement 224 of FIGS. 3-11 are also applicable to the transaxle arrangement 124 of FIGS. 1, 2A, and 2B (and vice versa).

Figure 3:
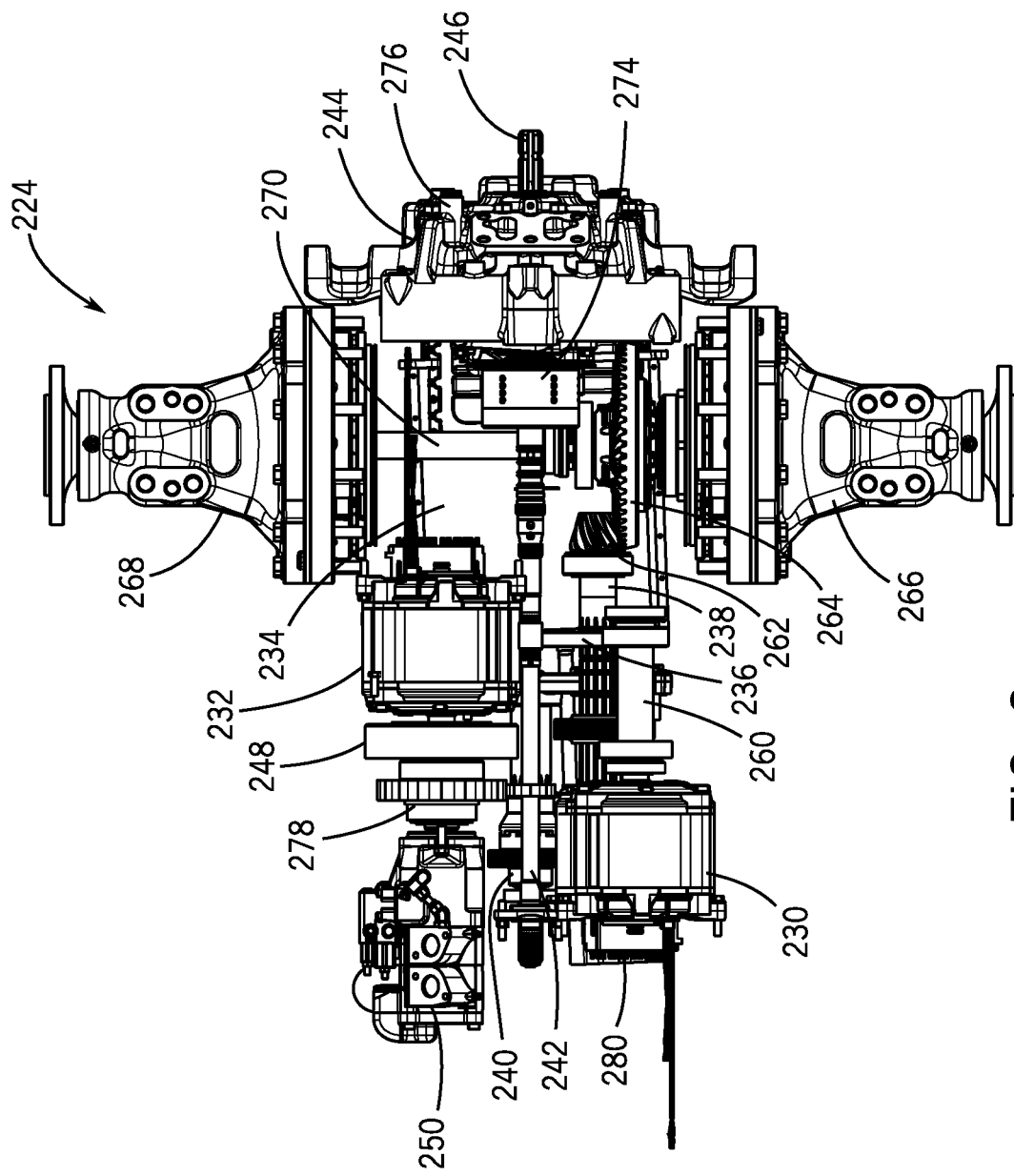
FIG. 3 is a top view of a transaxle arrangement that may be incorporated into either of the power systems of FIGS. 2A and 2B according to an example embodiment of the present disclosure.
Figure 4:
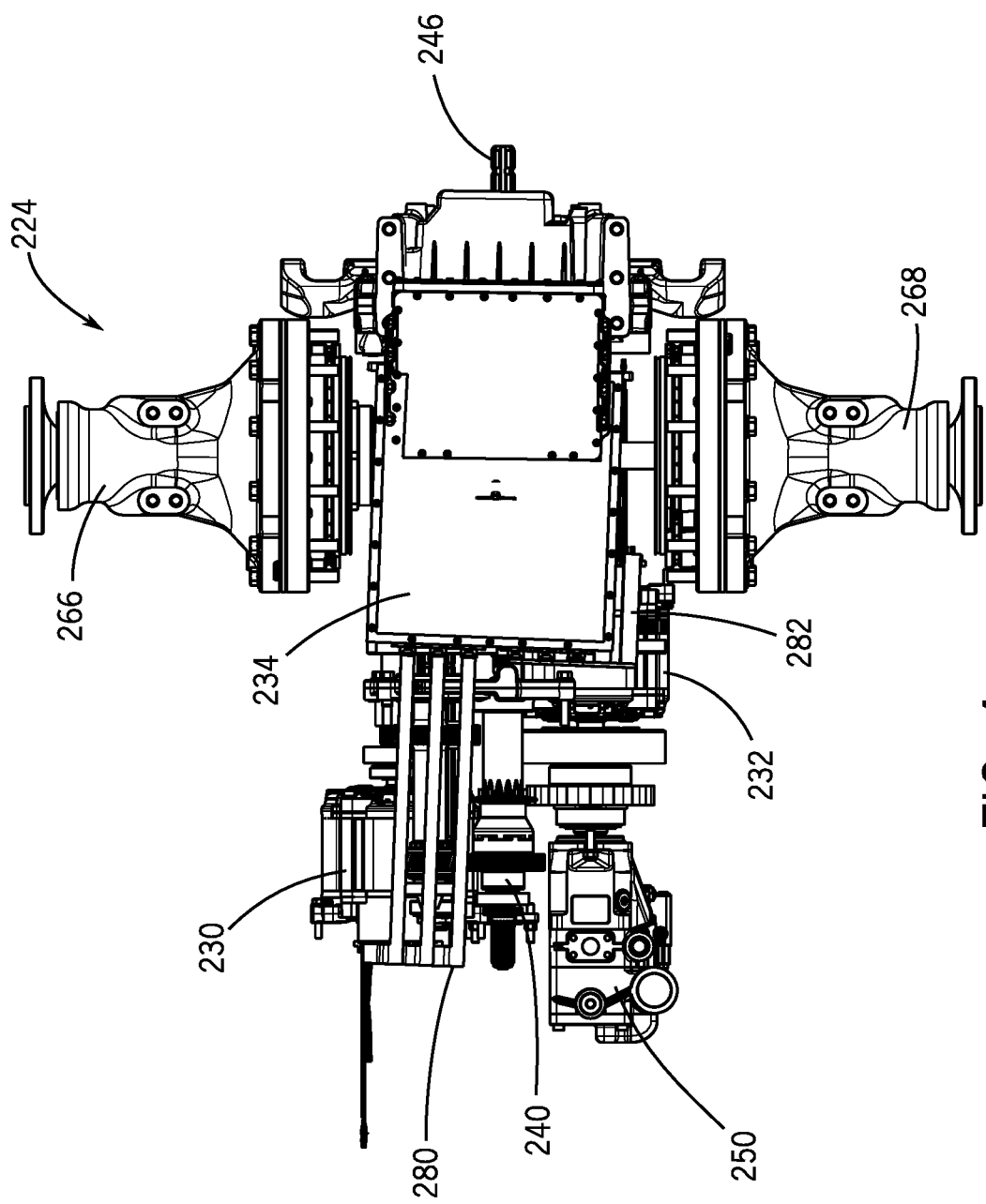
FIG. 4 is a bottom view of the transaxle arrangement of FIG. 3 that may be incorporated into either of the power systems of FIGS. 2A and 2B according to an example embodiment of the present disclosure.
Figure 5:
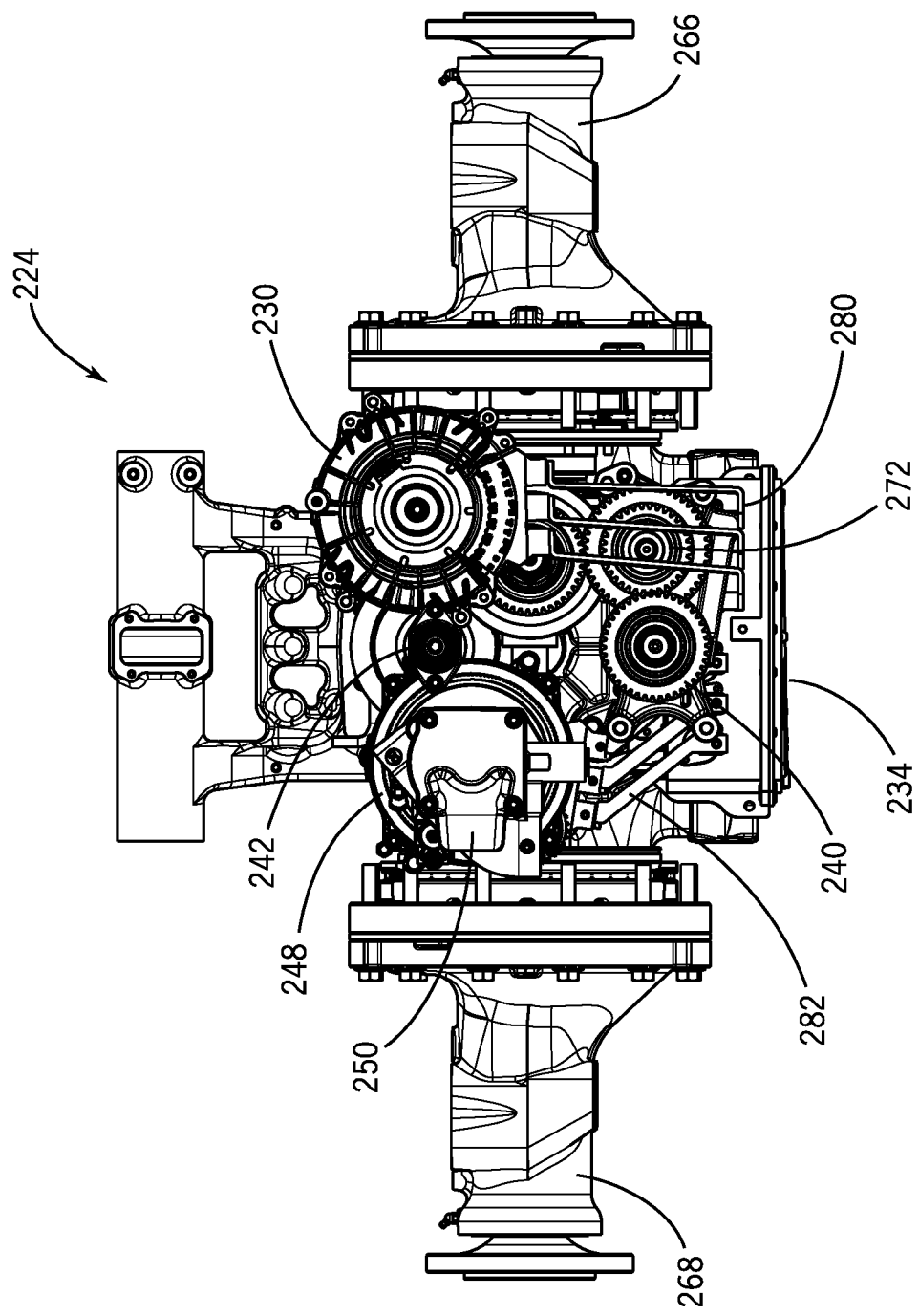
FIG. 5 is a front side view of the transaxle arrangement of FIG. 3 that may be incorporated into either of the power systems of FIGS. 2A and 2B according to an example embodiment of the present disclosure.
Figure 6:
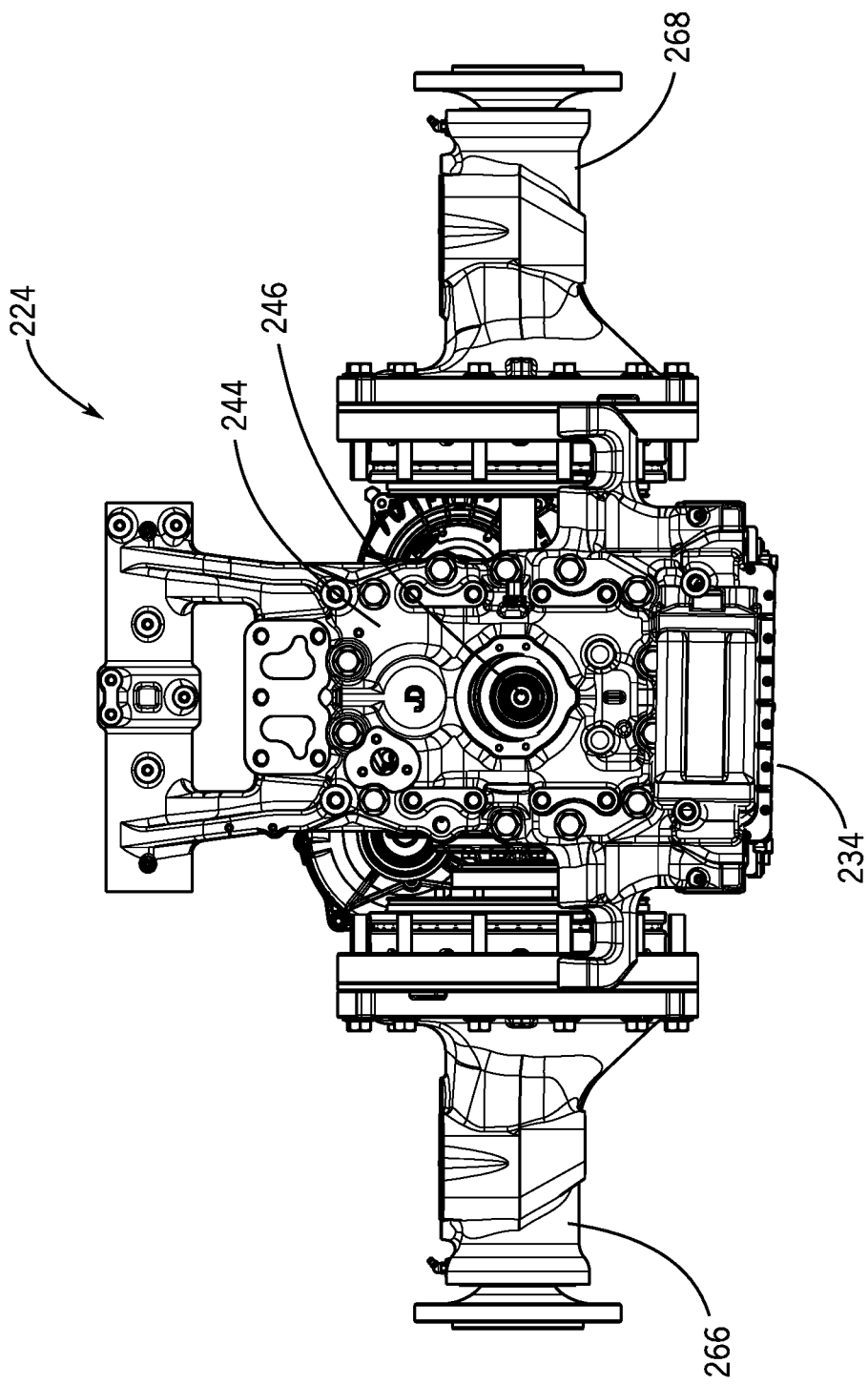
FIG. 6 is a rear side view of the transaxle arrangement of FIG. 3 that may be incorporated into either of the power systems of FIGS. 2A and 2B according to an example embodiment of the present disclosure.
Figure 7:
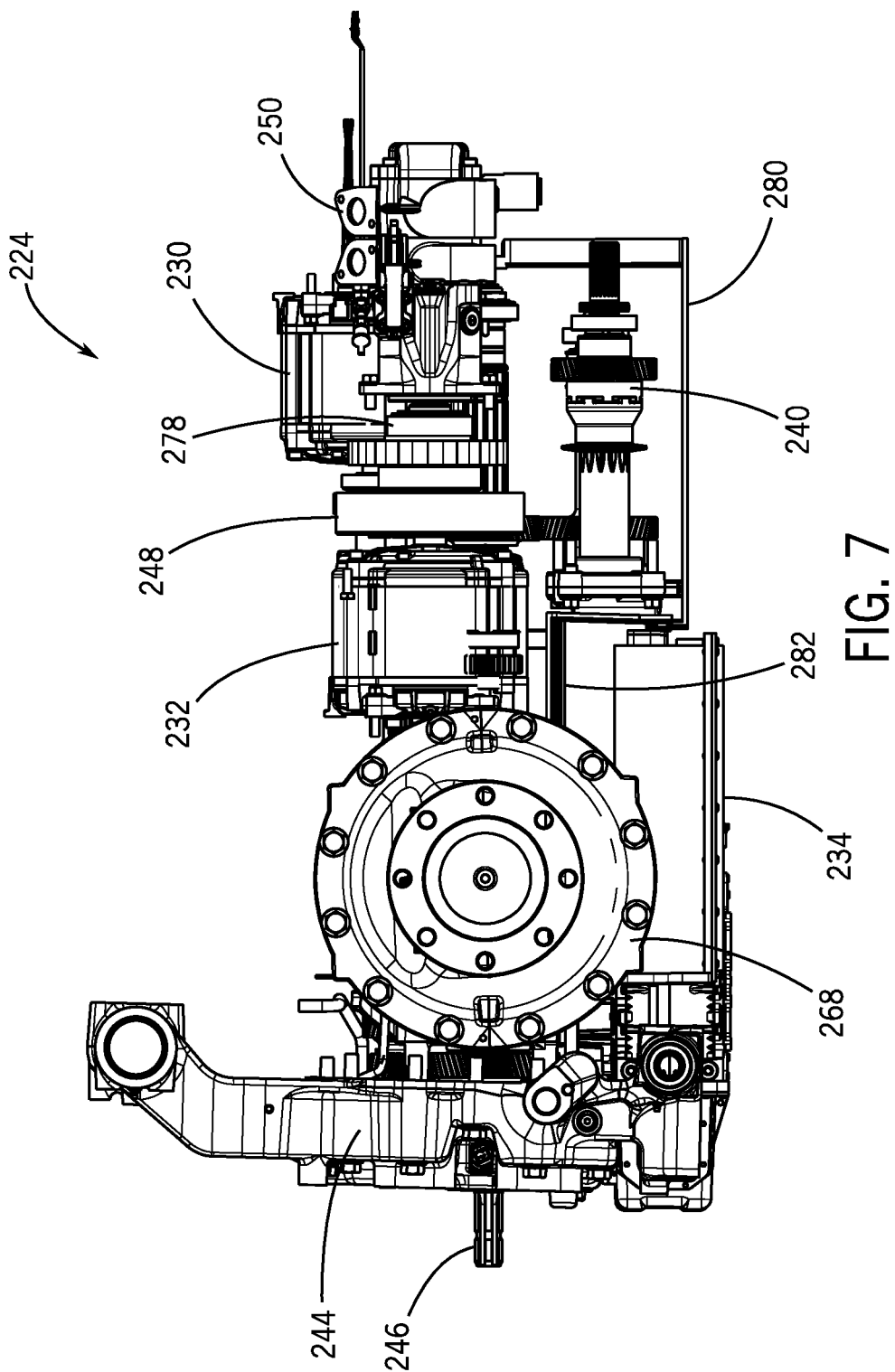
FIG. 7 is a first side view of the transaxle arrangement of FIG. 3 that may be incorporated into either of the power systems of FIGS. 2A and 2B according to an example embodiment of the present disclosure.
Figure 8:
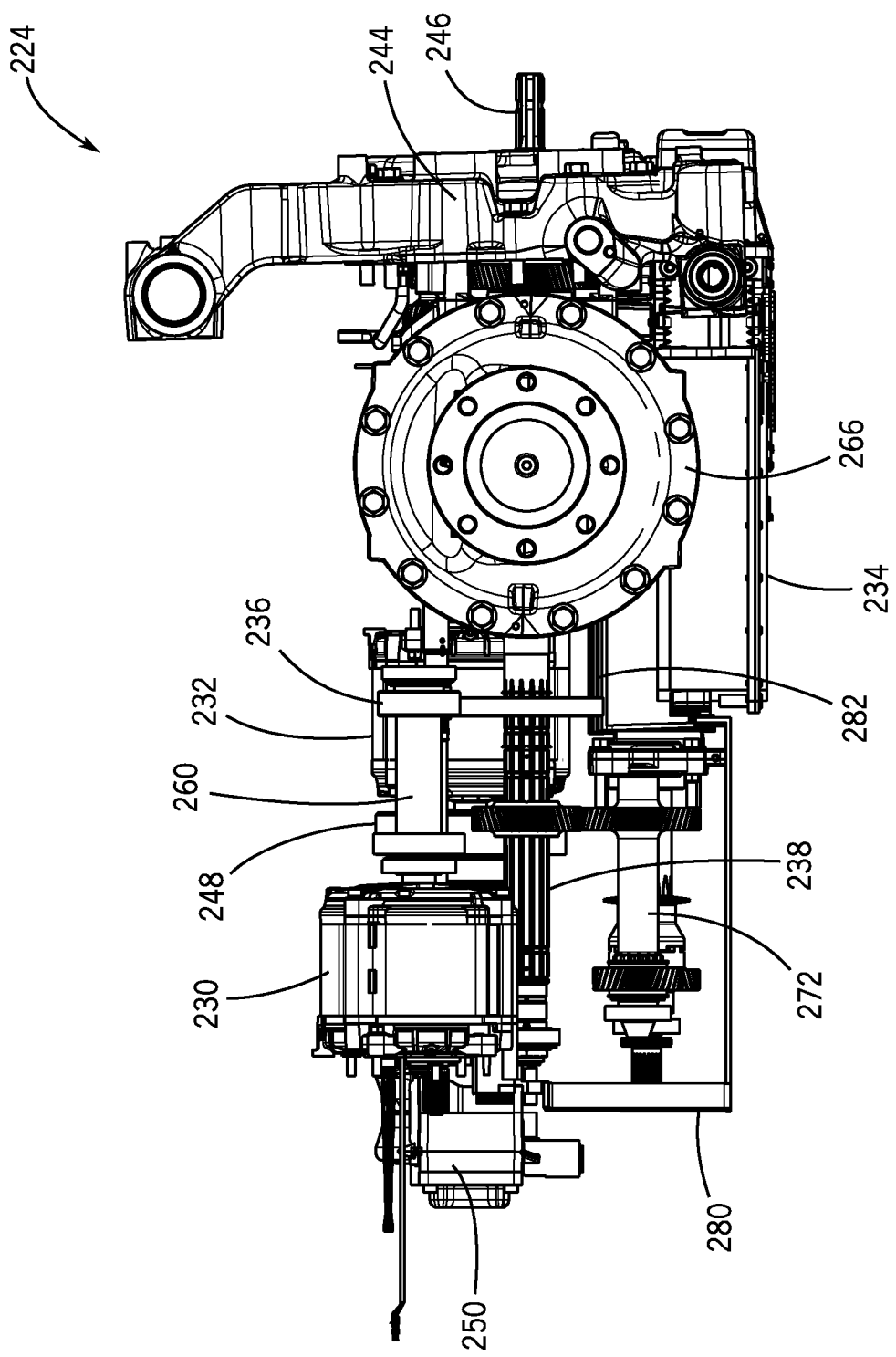
FIG. 8 is a second side view of the transaxle arrangement of FIG. 3 that may be incorporated into either of the power systems of FIGS. 2A and 2B according to an example embodiment of the present disclosure.
Figure 9:
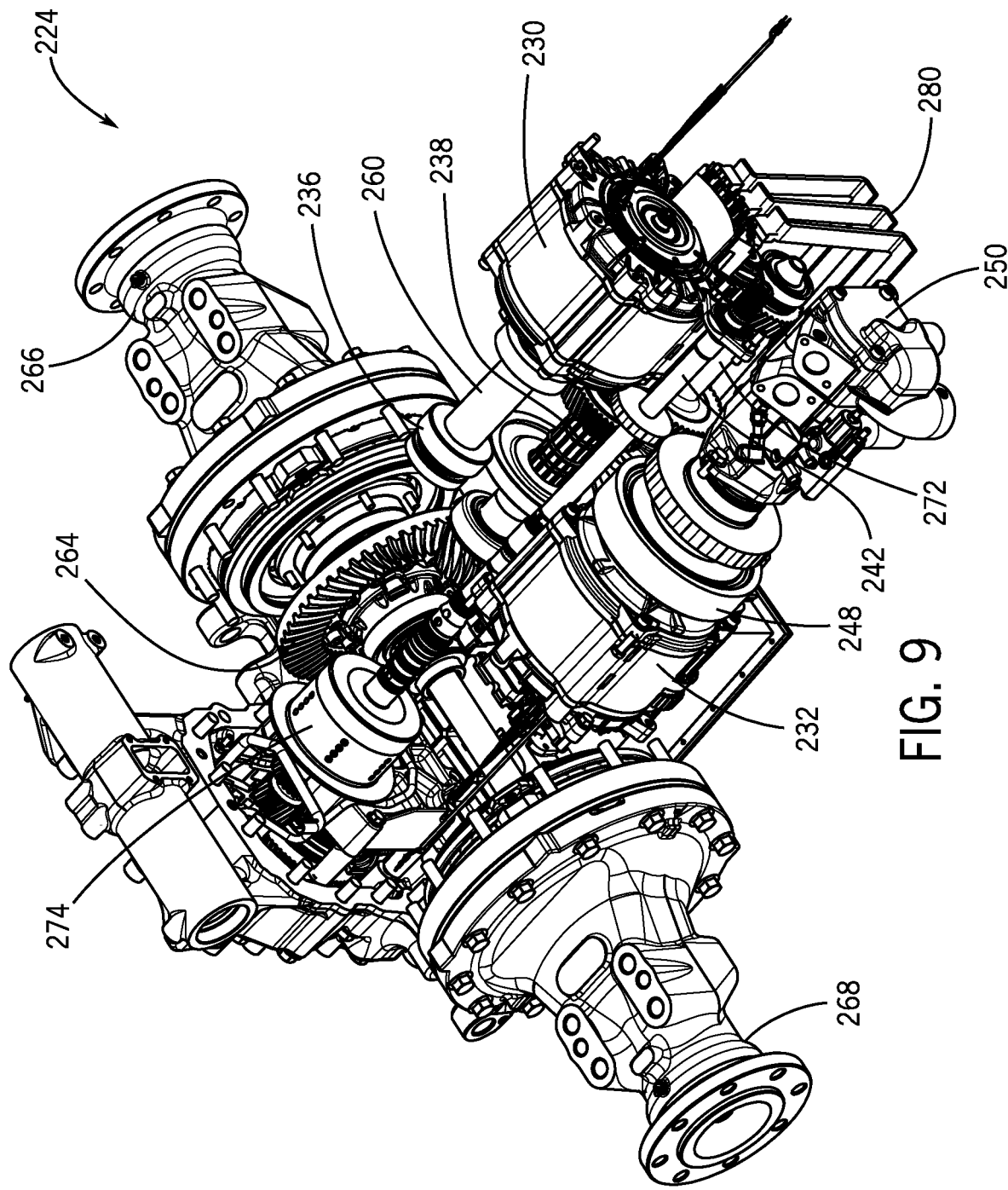
FIG. 9 is a top front isometric side view of the transaxle arrangement of FIG. 3 that may be incorporated into either of the power systems of FIGS. 2A and 2B according to an example embodiment of the present disclosure.
Figure 10:
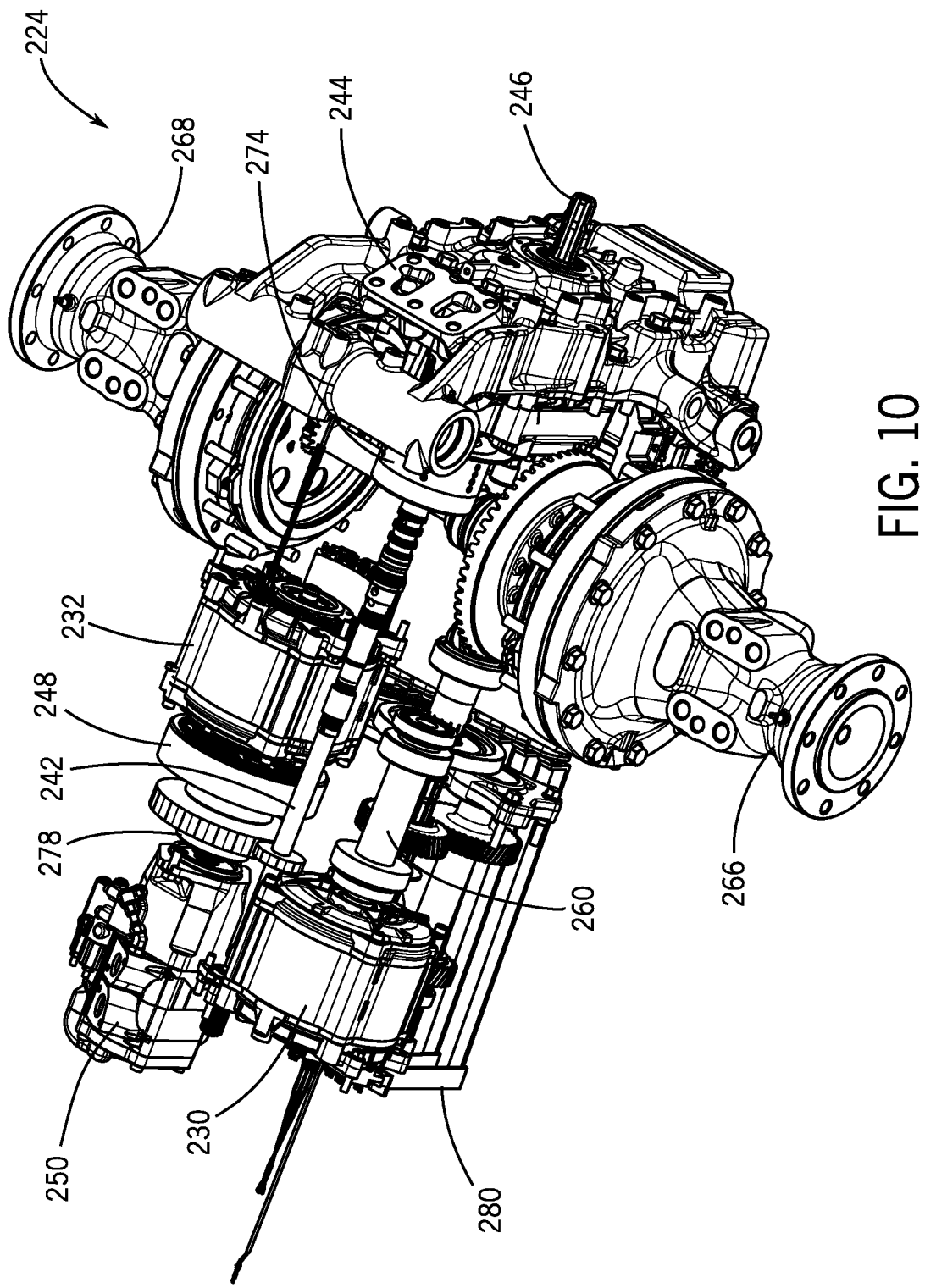
FIG. 10 is a top rear isometric side view of the transaxle arrangement of FIG. 3 that may be incorporated into either of the power systems of FIGS. 2A and 2B according to an example embodiment of the present disclosure.
Figure 11:
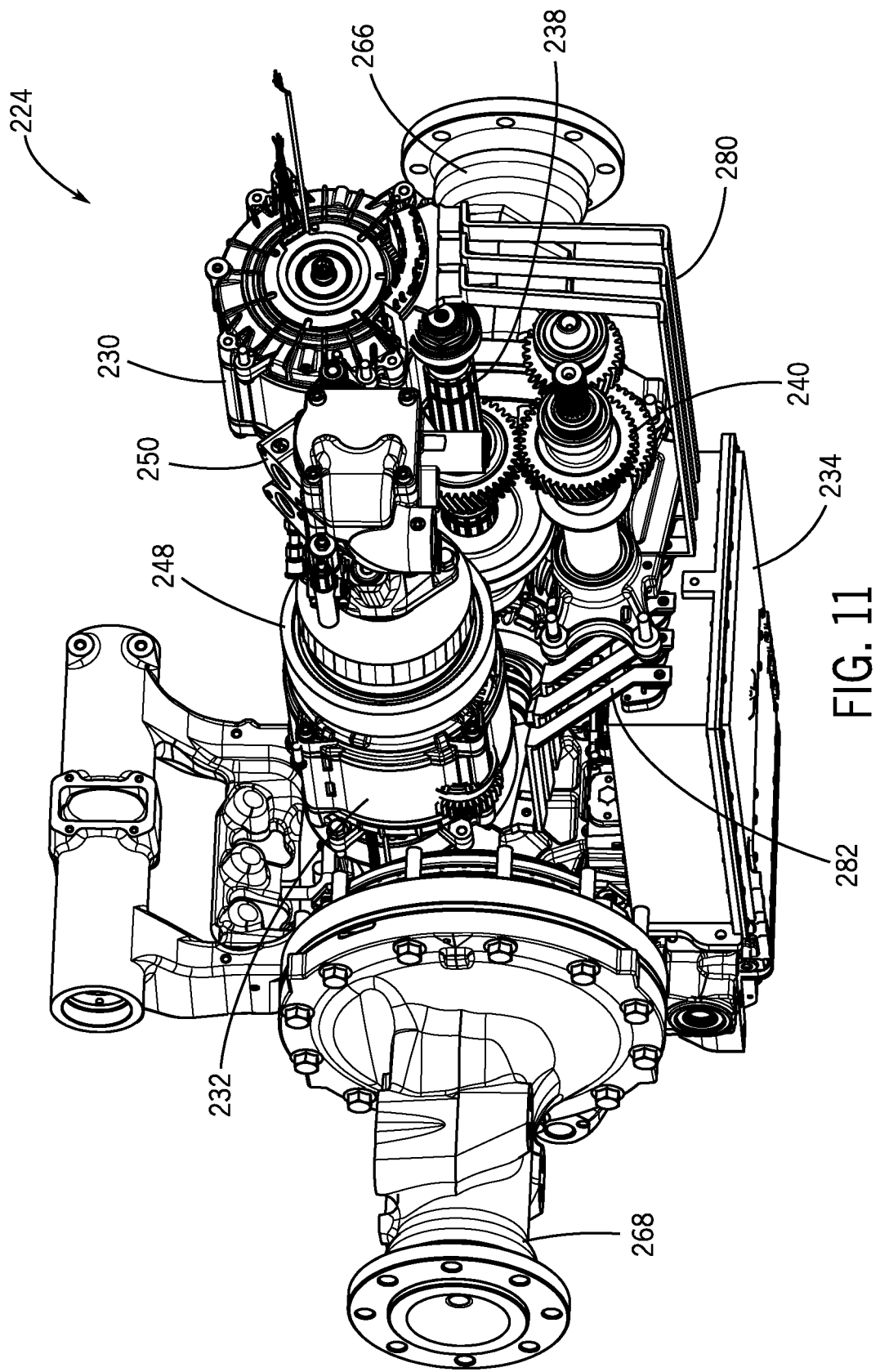
FIG. 11 is a bottom front isometric side view of the transaxle arrangement of FIG. that may be incorporated into either of the power systems of FIGS. 2A and 2B according to an example embodiment of the present disclosure.

As shown, the views of FIGS. 3 and 4 may be considered a top plan view and a bottom plan view, respectively; the views of FIGS. 5 and 6 may be considered front and rear side views, respectively; the views of FIGS. 7 and 8 may be considered first and second lateral side views, respectively; and the views of FIGS. 9-11 are various isometric views. The views of FIGS. 3-11 provide examples of a particular physical arrangement or implementation of the transaxle arrangement 124, but other arrangements or implementations may be provided.

In this example, as above, the transaxle arrangement 224 may include one or more electric machines 230, 232 and generally function to receive, convert, and condition mechanical and/or electrical power to drive a number of power sinks, including a DDS 238, an MFWD shaft 240, a rear PTO shaft 246, and a hydraulic pump 250, as described in greater detail below. In other examples, one or more of these power sinks may be omitted or modified, and/or one or more additional power sinks may be provided.

As above, the transaxle arrangement 224 may vary operation depending on the broader vehicle configuration. In particular, the transaxle arrangement 224 may operate to distribute power from an engine (e.g., engine 120 of FIG. 1) in combination with one or more batteries (e.g., battery 122 of FIG. 1) as a hybrid configuration or from only one or more batteries (e.g., generally, battery) as an electric-only configuration. The physical and functional interactions of the various components of the transaxle arrangement 224 will be initially described prior to a further discussion of operation in the hybrid and electric-only configurations.

As best shown in FIGS. 3 and 4, the first and second electric machines 230, 232 may be electrically coupled to an inverter 234 via first and second bus bars 280, 282, which are discussed in greater detail below. As noted, the inverter 234 functions to condition power to and from the electric machines 230, 232 and/or battery (not shown in FIGS. 3-11).

The first electric machine 230 may be coupled to a motor generator shaft (e.g., an "output shaft") 260 that may be mechanically driven by the first electric machine 230 when the first electric machine 230 is operating as a motor. Alternately, the shaft 260 may operate as an input shaft to drive the first electric machine 230 if and when the electric machine 230 operates as a generator. In any event, the motor generator shaft 260 may engage the DDS 238 via one or more gears (e.g., a DDS gear 262) such that the motor generator shaft 260 may drive the DDS 238. In this example, the DDS 238 is a shaft with one or more power transfer features that engages a differential 264. The DDS 238 may also include or otherwise interact with a countershaft 272 with power transfer elements (e.g., gears) that interact with corresponding elements on the DDS 238 to modify the power characteristics between the electric machine 230 and the differential 264. The differential 264 may distribute the mechanical power via one or more half-shafts 266, 268 and/or rear axle shaft 270 to each of the rear wheels (not shown in FIGS. 3-11). In this example, the differential 264 includes a bevel gear arrangement with the DDS 238 to redirect and distribute the mechanical power to the near half-shaft 266 and, via rear axle shaft 270, to the distal half-shaft 268. Although not shown in detail, the differential 264 may include various housings, bearings and support elements, gear arrangements (e.g., planetary gear sets) and the like to appropriately condition the power driving the wheels (e.g., wheels 108 of FIG. 1).

The countershaft 272 additionally has power transfer elements (e.g., gears) that interact with corresponding elements on the MFWD shaft 240. As a result, the power from the first electric machine 230 may pass through the DDS 238 and countershaft 272 to drive the MFWD shaft 240, which in turn, may drive an MFWD at the front wheels (e.g., wheels 106 of FIG. 1). As noted above, the MFWD shaft 240 extends from the front of the transaxle arrangement 224. In some examples, the MFWD shaft 240 may operate as a front PTO shaft to power other types of mechanisms.

Collectively, one or more of shaft 260, DDS gear 262, countershaft 272, and/or differential 264 may be considered the wheel drive gear assembly 236 that conditions the power flow between the electric machine 230 and the rear wheels, as well as between the electric machine 230 and the MFWD shaft 240. Other arrangements may be provided.

As also depicted in the transaxle arrangement 224 of FIGS. 3-11, the second electric machine 232 is positioned to engage the pi drive gear assembly 248, which in turn is positioned to engage a drive shaft of the pump 250. The pi drive gear assembly 248 may also be considered to include or otherwise interact with a drive interface 278 mounted between the planetary gear set of the pi drive gear assembly 248 and the pump 250. The drive interface 278 additionally interacts with the main shaft 242 such that rotational power may be transferred from the main shaft 242 to the pi drive gear assembly 248 and to the second electric machine 232 or may be transferred from the second electric machine 232 to the pi drive gear assembly 248 to the main shaft 242.

The main shaft 242 is coupled to the PTO shaft 246 via the PTO gear assembly 244 and a PTO clutch 274. The PTO gear assembly 244 may be housed within a gear assembly housing 276. In general, the PTO clutch 274 enables selective rotational coupling (and uncoupling) between the main shaft 242 and the PTO gear assembly 244, and the PTO gear assembly 244 enables conditioning of the rotational power from the main shaft 242 to the PTO shaft 246. In some examples, the PTO gear assembly 244 includes one or more clutches and/or gears that enable the selection of multiple speeds for the PTO shaft 246.

In this example, various housing elements may be provided to house the components of the transaxle arrangement 224. As examples, such housing elements may provide mounting and support surfaces for the rear wheels and/or for the mounting of the transaxle arrangement 224 on the work vehicle. Generally, the transaxle arrangement 224 may be mounted to the rear portion of an engine, and as noted above, may function as part of the frame or chassis of the work vehicle. In other examples, the transaxle arrangement 224 may be mounted on a chassis or frame.

As noted above, and now particularly referring to FIG. 11, the bus bars 280, 282 electrically couple the electric machines 230, 232 to the inverter 234. As shown, the bus bars 280, 282 may be shaped and formed to avoid the other elements of the transaxle arrangement 224. For example, the bus bars 280 may be extended and angled around the countershaft 272.

As noted above, the transaxle arrangement 224 may vary operation depending on the broader vehicle configuration. In particular, the transaxle arrangement 224 may be configured to operate within a vehicle with an engine (e.g., engine 120 of FIG. 1) or without.

In a hybrid configuration (e.g., with an engine), the transaxle arrangement 224 may receive rotational power from the engine (not shown in FIGS. 3-11) via the main shaft 242 to drive the PTO shaft 246 via the PTO gear assembly 244. The rotational power from the engine may also be used to drive the pump 250 and/or the second electric machine 232. As shown, in one example, the pump 250 and/or second electric machine 232 may receive the rotational power from the engine via interaction between the main shaft 242 and the pi drive gear assembly 248. In this example, upon receipt of engine power, the electric machine 232 may operate as a generator in order to convert the rotational power into electrical power, which may be directed (and/or conditioned) via the inverter 234 to be stored in the battery (not shown in FIGS. 3-11) and/or transferred to the first electric machine 230. In additional to the power received via the inverter 234 from the second electric machine 232, the battery may also supplement the electrical power directed to the first electric machine 230 via the inverter 234. In this implementation, the first electric machine 230 may operate as a motor in order convert the electrical power from the inverter 234 into mechanical power. The mechanical power from the first electric machine 230 may be used to drive the DDS 238 and the MFWD shaft 240 via the wheel drive gear assembly 236.

In an electric-only configuration (e.g., without an engine), the battery (not shown in FIGS. 3-11) provides electrical power to the inverter 234, which distributes the electrical power the first electric machine 230 and the second electric machine 232. As above, the first electric machine 230 operates as a generator to convert the electrical power into mechanical power, which may be used to drive the DDS 238 and the MFWD shaft 240 via the wheel drive gear assembly 236. In this implementation, the second electric machine 232 also operates as motor to convert the electrical power into mechanical power in order to drive the pump 250 via the pi drive gear assembly 248. Additionally, the mechanical power may be transferred via the pi drive gear assembly 248 (or other mechanism) to the main shaft 242 in order to drive the rear PTO shaft 246 via the PTO gear assembly 244.

Due to the variability of the electric machines 230, 232, the transaxle arrangement 224 may be considered to drive the rear wheels via the DDS 238 in a "single" mode. In other words, power and speed clutches for the DDS 238 are not typically necessary. However, in other examples, one or more clutches may be provided. For example, a creeper clutch may be provided to enable relatively low speed operation.

CONCLUSION

The foregoing describes one or more examples of a transaxle arrangement that may be implemented in either a hybrid configuration or an electric-only configuration, thereby providing an ability to use the transaxle arrangement across platforms that include or do not include an engine.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

Finally, as used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle transaxle arrangement for a work vehicle having a battery, one or more axle half-shafts, a differential configured to distribute power to the one or more axle half-shafts, and hydraulic functions, the work vehicle transaxle arrangement is a single integrated assembly comprising a transaxle housing, at least in part, housing:
   a main shaft;
   at least one transaxle gear assembly mechanically coupled to the main shaft;
   a differential drive shaft coupled to the differential;
   a first electric machine configured to drive rotation of the differential drive shaft such that mechanical power from the differential drive shaft is distributed through the differential to the one or more axle half-shafts;
   a second electric machine rotationally coupled to the main shaft via the at least one transaxle gear assembly;
   an inverter through which the first electric machine and the second electric machine are electrically coupled and configured to be coupled to the battery;
   a power takeoff shaft (PTO) shaft mechanically driven through the at least one transaxle gear assembly; and
   a hydraulic pump driven through the at least one transaxle gear assembly to provide hydraulic fluid flow to the hydraulic functions of the work vehicle;
   wherein, (i) in a hybrid work vehicle configuration, the main shaft is configured to be driven by an internal combustion engine to power the PTO shaft and the second electric machine such that the second electric machine generates electrical power routed through the inverter to at least partially drive the first electric machine; and (ii) in an electric-only work vehicle configuration, the second electric machine is driven by electrical power routed through the inverter and drawn from the battery to generate mechanical power that drives the PTO shaft and the hydraulic pump through the at least one transaxle gear assembly.

2. The work vehicle transaxle arrangement of claim 1, wherein, in the hybrid work vehicle configuration, the hydraulic pump is driven by mechanical power from the main shaft.

3. The work vehicle transaxle arrangement of claim 1, wherein the PTO shaft is a rear PTO shaft and the transaxle arrangement further comprises a front PTO shaft mechanically driven through the at least one transaxle gear assembly.

4. The work vehicle transaxle arrangement of claim 3, wherein, in each of the hybrid work vehicle configuration and the electric-only work vehicle configuration, the front PTO shaft is driven with mechanical power from the first electric machine via the at least one transaxle gear assembly.

5. The work vehicle transaxle arrangement of claim 4, wherein the at least one transaxle gear assembly includes a countershaft engaged with each of the differential drive shaft and the front PTO shaft such that, in each of the hybrid work vehicle configuration and the electric-only work vehicle configuration, the front PTO shaft is driven with mechanical power from the first electric machine that is routed through the differential drive shaft and the countershaft to the front PTO shaft.

6. The work vehicle transaxle arrangement of claim 5, wherein the front PTO shaft is a mechanical front wheel drive (MFWD) shaft.

7. The work vehicle transaxle arrangement of claim 1, wherein, in the electric-only work vehicle configuration, the PTO shaft is driven by mechanical power from the second electric machine that is routed from the second electric machine, through the main shaft, and to the PTO shaft via the at least one transaxle gear assembly.

8. The work vehicle transaxle arrangement of claim 1, wherein the at least one transaxle gear assembly includes a PTO gear assembly disposed between the main shaft and the PTO shaft.

9. The work vehicle transaxle arrangement of claim 1, wherein the at least one transaxle gear assembly includes a pi drive gear assembly disposed between the main shaft and the second electric machine.

10. The work vehicle transaxle arrangement of claim 1, wherein in each of the hybrid work vehicle configuration and the electric work vehicle configuration, the first electric machine drives rotation of the differential drive shaft such that mechanical power from the differential drive shaft is distributed through the differential to the one or more axle half-shafts in a single mode without intervening clutches.

11. The work vehicle transaxle arrangement of claim 1, further comprising a first set of bus bars electrically coupling the first electric machine to the inverter and a second set of bus bars electrically coupling the second electric machine to the inverter.

12. The work vehicle transaxle arrangement of claim 11, wherein at least one of the first set of bus bars or the second set of bus bars are configured to extend around at least a portion of the at least one transaxle gear assembly.

13. A work vehicle power system, comprising:
   a battery; and
   a work vehicle transaxle arrangement receiving electrical power from the battery, the work vehicle transaxle arrangement is a single integrated assembly having a transaxle housing, at least in part, housing:
      one or more axle half-shafts configured to transfer mechanical power to one or more wheels;
      a differential configured to distribute power to the one or more axle half-shafts;
      a main shaft;
      at least one transaxle gear assembly mechanically coupled to the main shaft;
      a differential drive shaft coupled to the differential;
      a first electric machine configured to drive rotation of the differential drive shaft such that mechanical power from the differential drive shaft is distributed through the differential to the one or more axle half-shafts;
      a second electric machine rotationally coupled to the main shaft via the at least one transaxle gear assembly;

an inverter through which the first electric machine and the second electric machine are electrically coupled and configured to be coupled to the battery;

a power takeoff shaft (PTO) shaft mechanically driven through the at least one transaxle gear assembly; and a hydraulic pump driven through the at least one transaxle gear assembly to provide hydraulic fluid flow for hydraulic functions of the work vehicle;

wherein, (i) in a hybrid work vehicle configuration, the main shaft is configured to be driven by an internal combustion engine to power the PTO shaft and the second electric machine such that the second electric machine generates electrical power routed through the inverter to at least partially drive the first electric machine; and (ii) in an electric-only work vehicle configuration, the second electric machine is driven by electrical power routed through the inverter and drawn from the battery to generate mechanical power that drives the PTO shaft and the hydraulic pump through the at least one transaxle gear assembly.

14. The work vehicle power system of claim 13, further comprising the engine configured to drive the main shaft during the hybrid work vehicle configuration; and a controller configured to selectively discontinue operation of the engine to operate in the electric-only work vehicle configuration.

15. The work vehicle power system of claim 13, wherein the PTO shaft is a rear PTO shaft and the transaxle arrangement further comprises a front PTO shaft mechanically driven through the at least one transaxle gear assembly.

16. The work vehicle power system of claim 15, wherein, in each of the hybrid work vehicle configuration and the electric-only work vehicle configuration, the front PTO shaft is driven with mechanical power from the first electric machine via the at least one transaxle gear assembly.

17. The work vehicle power system of claim 16, wherein the at least one transaxle gear assembly includes a countershaft engaged with each of the differential drive shaft and the front PTO shaft such that, in each of the hybrid work vehicle configuration and the electric-only work vehicle configuration, the front PTO shaft is driven with mechanical power from the first electric machine that is routed through the differential drive shaft and the countershaft to the front PTO shaft.

18. The work vehicle power system of claim 13, wherein, in the electric-only work vehicle configuration, the PTO shaft is driven by mechanical power from the second electric machine that is routed from the second electric machine, through the main shaft, and to the PTO shaft via the at least one transaxle gear assembly.

19. The work vehicle power system of claim 13, further comprising a first set of bus bars electrically coupling the first electric machine to the inverter and a second set of bus bars electrically coupling the second electric machine to the inverter.

20. The work vehicle power system of claim 19, wherein at least one of the first set of bus bars or the second set of bus bars are configured to extend around at least a portion of the at least one transaxle gear assembly.

\* \* \* \* \*